(12) United States Patent
Hereld et al.

(10) Patent No.: US 7,019,713 B2
(45) Date of Patent: Mar. 28, 2006

(54) METHODS AND MEASUREMENT ENGINE FOR ALIGNING MULTI-PROJECTOR DISPLAY SYSTEMS

(75) Inventors: Mark Hereld, Chicago, IL (US); Ivan R. Judson, Chicago, IL (US); Rick L. Stevens, Naperville, IL (US)

(73) Assignee: The University of Chicago, Chicago, IL (US)

( * ) Notice: Subject to any disclaimer, the term of this patent is extended or adjusted under 35 U.S.C. 154(b) by 412 days.

(21) Appl. No.: 10/283,719

(22) Filed: Oct. 30, 2002

(65) Prior Publication Data

US 2004/0085256 A1    May 6, 2004

(51) Int. Cl.
*G09G 5/00* (2006.01)

(52) U.S. Cl. .............................. 345/1.1; 345/1.3; 345/4

(58) Field of Classification Search ................. 345/1.1, 345/32, 581, 1, 204, 1.3, 19, 20, 4, 589, 613; 348/383, 189, 744–747, 36; 600/160; 353/121, 353/30, 20; 343/720; 399/27
See application file for complete search history.

(56) References Cited

U.S. PATENT DOCUMENTS

| | | | |
|---|---|---|---|
| 5,926,145 A * | 7/1999 | Honma ....................... 343/720 |
| 6,219,099 B1 * | 4/2001 | Johnson et al. ............. 348/383 |
| 6,310,650 B1 | 10/2001 | Johnson et al. |
| 6,377,306 B1 * | 4/2002 | Johnson et al. ............. 348/383 |
| 6,503,195 B1 * | 1/2003 | Keller et al. ................. 600/160 |
| 6,834,965 B1 * | 12/2004 | Raskar et al. ................. 353/94 |
| 6,863,400 B1 * | 3/2005 | Liang ........................... 353/20 |
| 2002/0070944 A1 * | 6/2002 | Deering ....................... 345/581 |
| 2003/0052837 A1 * | 3/2003 | Raskar ......................... 345/32 |
| 2003/0067587 A1 * | 4/2003 | Yamasaki et al. ............. 353/30 |
| 2003/0085906 A1 * | 5/2003 | Elliott et al. ................. 345/613 |
| 2003/0103058 A1 * | 6/2003 | Elliott et al. ................. 345/589 |
| 2003/0206179 A1 * | 11/2003 | Deering ....................... 345/589 |
| 2004/0085477 A1 * | 5/2004 | Majumder et al. .......... 348/383 |
| 2004/0156645 A1 * | 8/2004 | Nakazato ..................... 399/27 |
| 2004/0184013 A1 * | 9/2004 | Raskar et al. ............... 353/121 |

* cited by examiner

*Primary Examiner*—Vijay Shankar
*Assistant Examiner*—Prabodh Dharia
(74) *Attorney, Agent, or Firm*—Joan Pennington

(57) ABSTRACT

An image pattern description is stored and tiled display test pattern images are captured. The stored image pattern description and at least one captured tiled display test pattern image are used to identify a tile array placement and layout; a tile registration measurement; and a dot grid measurement providing measured dot grid positions. At least one captured tiled display test pattern images and the measured dot grid positions are used for calculating tile-to-camera maps and a camera-to-mural map. The tile-to-camera maps and the camera-to-mural map are used to generate control and correction data.

20 Claims, 14 Drawing Sheets

METHODS AND MEASUREMENT ENGINE FOR ALIGNING MULTI-PROJECTOR DISPLAY SYSTEMS

CONTRACTUAL ORIGIN OF THE INVENTION

The United States Government has rights in this invention pursuant to Contract No. W-31-109-ENG-38 between the United States Government and Argonne National Laboratory.

RELATED APPLICATION

A related U.S. patent application Ser. No. 10/283,991, entitled "METHOD TO SMOOTH PHOTOMETRIC VARIATIONS ACROSS MULTI-PROJECTOR DISPLAYS" by Aditi Majumder and Rick Stevens and assigned to the present assignee, is being filed on the same day as the present patent application.

FIELD OF THE INVENTION

The present invention relates to methods and a measurement engine for aligning multi-projector display systems.

DESCRIPTION OF THE RELATED ART

Tiled projection display systems use multiple projectors to produce a large, high resolution image. In many known systems, multiple screens are placed next to each other to form a large image display. A problem with many of the multi-projector display systems is that the multiple images often do not appear as one single continuous image on the display screen. When multiple images are projected on a single screen, typically the composite image includes alignment errors and optical distortions. In the composite image, often there are seams or bright lines between the multiple images.

A need exists for improved methods and a measurement engine for aligning multi-projector display systems. The properties of projectors and aggregates of projectors that can contribute to geometrical mismatch in the image plane are imperfect projector optics and misalignment in six degrees-of-freedom of each projector with respect to the display surface.

A common approach to the problem of achieving a unified and uniform geometrical basis for image presentation on tiled displays is to carefully align the projectors in the tiled array. Indeed, this is very often the starting place even when additional methods are employed. This involves adjusting the position, orientation, and zoom for each projector in an attempt to obtain the desired pixel-to-pixel relationships. Assuming that projector optics do not introduce any distortion, it is time consuming and extremely difficult to align pixels in each tile so that they are aligned with the nearest pixels of neighboring projected tiles, and introduce no tile-to-tile gap.

U.S. Pat. No. 6,310,650 issued Oct. 30, 2001 discloses a method for calibrating a tiled display system. One or more cameras are provided to capture an image of the display screen. The resulting captured image is processed to identify any non-desirable characteristics, including visible artifacts such as, seams, bands, and rings. Then an appropriate transformation function is determined. The transformation function is used to pre-warp the input video signal that is provided to the display such that the non-desirable characteristics are reduced or eliminated from the display. The transformation function preferably compensates for spatial non-uniformity, color non-uniformity, luminance non-uniformity, and other visible artifacts.

U.S. Pat. No. 6,377,306 issued Apr. 23, 2002 discloses a display for producing a seamless composite image from at least two discrete images. The display includes one or more projectors for projecting each of the discrete images separately onto a screen such that at least one of the discrete images overlaps at least one other of the discrete images by more than 25 percent. The amount of overlap that is required to reduce the seams of the composite image to an acceptable level over a predetermined viewing angle depends on a number of factors including the field-of-view and aperture size of the projectors, and the screen gain profile. For rear-projection screens and some front projection screens, an overlap of more than 25 percent is acceptable.

A principal object of the present invention is to provide methods and a measurement engine for aligning multi-projector display systems.

It is another object of the present invention to provide such methods and measurement engine to produce geometrical seam continuity across the transitions from one projector to a neighbor projector in the composite image.

It is another object of the present invention to provide such methods and measurement engine for aligning multi-projector display systems to correct the effects of the geometrical relationships between pixels in all of the individual projected sub-images to produce a geometrically uniform and continuous composite image.

Other important objects of the present invention are to provide methods and measurement engine for aligning multi-projector display systems substantially without negative effect; and that overcome some disadvantages of prior art arrangements.

SUMMARY OF THE INVENTION

In brief, methods and a measurement engine are provided for aligning multi-projector display systems. An image pattern description is stored and tiled display test pattern images are captured. The stored image pattern description and at least one captured tiled display test pattern image are used to identify a tile array placement and layout; a tile registration measurement; and a dot grid measurement providing measured dot grid positions. At least one captured tiled display test pattern images and the measured dot grid positions are used for calculating tile-to-camera maps and a camera-to-mural map. The tile-to-camera maps and the camera-to-mural map are used to generate control and correction data.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
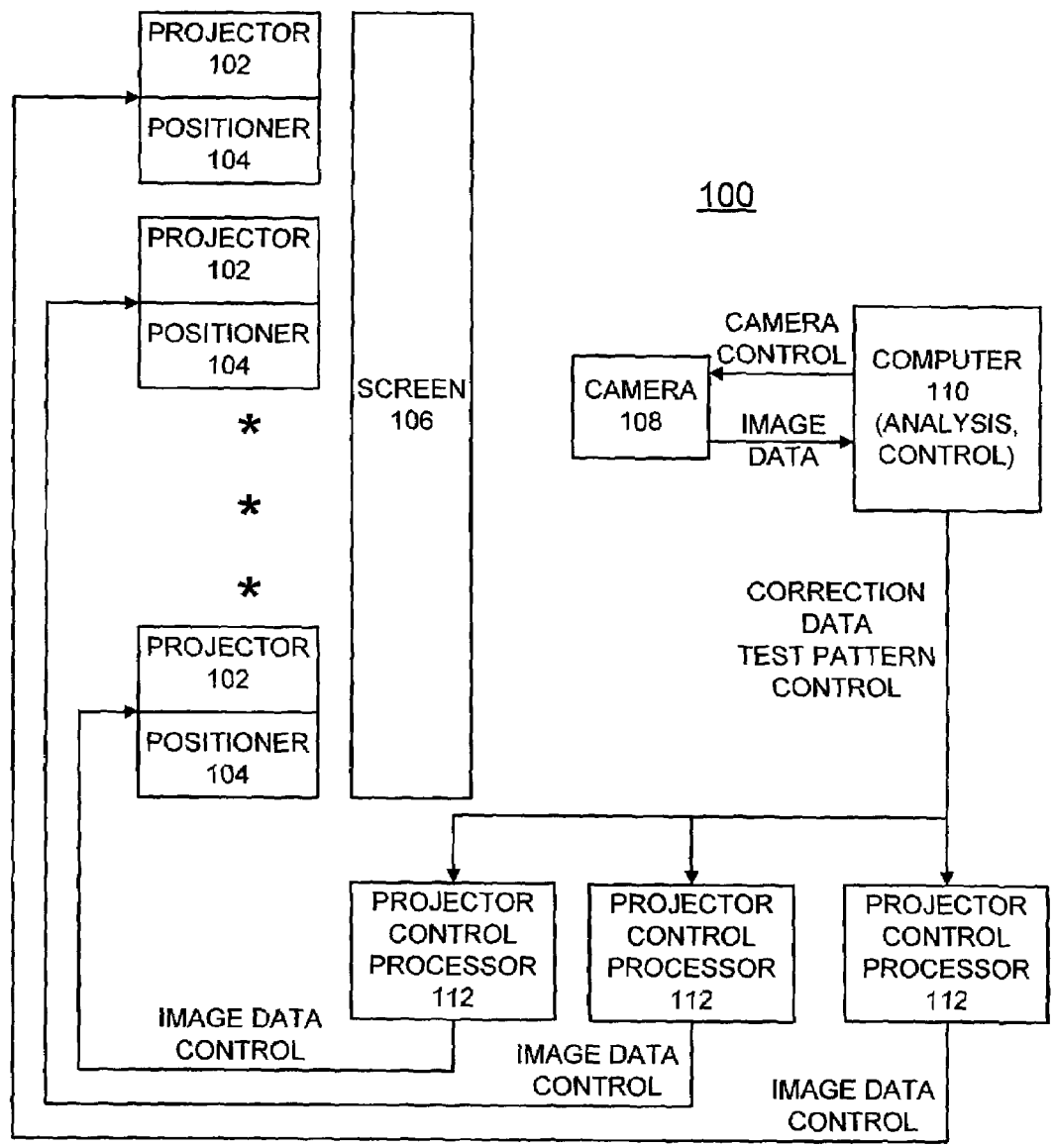
FIG. 1 is a block diagram representation illustrating a multi-projector display system for implementing the novel methods for aligning multi-projector display systems in accordance with the preferred embodiment.

Having reference now to the drawings, in FIG. 1 there is shown a multi-projector display system generally designated by the reference character 100 for implementing the novel methods for aligning multi-projector display systems in accordance with the preferred embodiment. Multi-projector display system 100 includes a plurality of projectors 102, each having an associated positioner 104, for projecting large area, high resolution tiled displays onto a display screen 106. Multi-projector display system 100 includes an array of multiple projectors 102, for example, a 3×5 array of 15 projectors 102. Multi-projector display system 100 includes a camera 108 for capturing tiled display images and applying image data to a computer 110 for analysis and implementing methods for aligning multi-projector display systems in accordance with the preferred embodiment. Computer 110 optionally operatively controls camera 108 as indicated at a line labeled camera control. Computer 110 applies correction data, test pattern and control to each of a plurality of projector control processors 112. Projector control processors 112 apply image data and control signals to the projectors 102 and associated positioners 104.

It should be understood that the present invention is not limited to the illustrated multi-projector display system 100. For example, a single server computer could be used instead of the plurality of projector control processors 112. Rather than using separate projector control processors 112, the respective projectors 102 could be provided with an integral control processor.

Various commercially available digital cameras can be used for camera 108, for example, a Nikon Coolpix 950 (1600×1200) or a Fujifilm MX-2900 Zoom (1800×1200). Using an un-calibrated camera 108 allows the use of relatively inexpensive digital cameras with little regard to setup. For example, a camera zoom function for the camera can be used casually to frame the display without needing to measure the relationship between ray angles and camera pixel position. Except for arranging that the captured image is unsaturated, there is little else that needs to be considered.

Various commercially available computers can be used for computer 110, for example, a personal computer or laptop computer. Computer 110 is suitably programmed to execute the flowcharts of FIGS. 2, 3, 7, 8, 9, 10, 11, 12, and 13 for implementing the novel methods for aligning multi-projector display systems in accordance with the preferred embodiment.

In accordance with features of the invention, a method is provided for measuring the positions of projected pixels on the display surface 106 by the array of projectors 102 whose images may overlap. The measuring method accurately detects alignment errors and optical distortions in each projector 102. The measurements are then used to correct the effects of the geometrical relationships between pixels in all of the individual projected sub-images to produce a geometrically uniform and continuous composite image.

In accordance with features of the invention, the method is implemented as a series of processing steps each of which can be modified or replaced, for example, as superior techniques become available. The method of the invention is implemented using Matlab. The analysis requires few exposures, for example, at most 5 snapshots of the tiled array with arrangements of two test patterns on the individual tiles. The test features of the two test patterns are described to the program to allow for a range of different patterns optimized for different situations. The output of the analysis is a parameterized mapping from each tile coordinate system (frame buffer pixel coordinates) to a unified coordinate system for the entire mural display.

Figure 2:
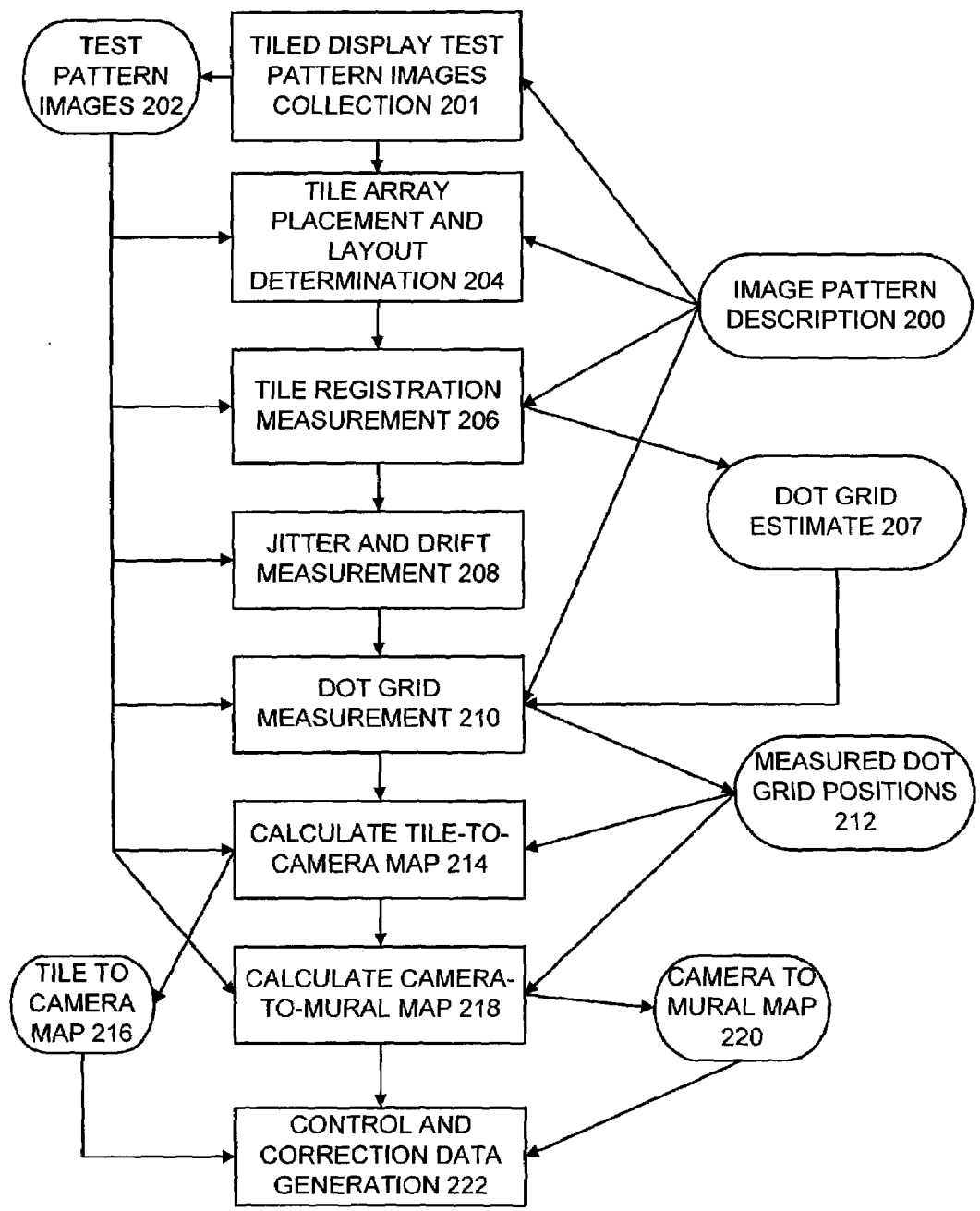
FIG. 2 is a flow chart illustrating exemplary steps of the methods for aligning multi-projector display systems in accordance with the preferred embodiment.

Referring now to FIG. 2, there are shown exemplary steps of the methods for aligning multi-projector display system 100 in accordance with the preferred embodiment. As indicated in a block 200, an image or test pattern description is provided. The image pattern description describes, for example, first and second test pattern images as illustrated and described with respect to FIGS. 3 and 4.

The Table 1 provides an example of a test pattern description as follows:

TABLE 1

```
% Describe test pattern image features.
%      x increases from left to right
%      y increases from top to bottom
%   1. rectangular tile marker in tile coordinates
%      a. upper left corner (x=col, y=row)
%      b. size in pixels (width=cols, height=rows)
%   2. registration marks in tile coordinates
%      a. upper left corner (x=col, y=row) OF EACH, L->R, T->B
%      b. size in pixels (width=cols, height=rows)
%   3. vast array of dots in tile coordinates
%      a. upper left corner (x=col, y=row)
%      b. size in pixels (width=cols, height=rows)
%      c. dot repeat spacing (delx,dely)
%      d. valid range (for each tile if different)
   % general
img.tile.size = [1024,768];     % pix: width, height
   % discovery pattern
img.rect.ulc = [250, 250];      % pix: col, row
img.rect.size = [500, 300];     % pix: width, height
img.reg.ulc = [200, 200;        % pix: left-to-right,
              800, 200;         %      top-to-bottom
              200, 600;
              800, 600];
img.reg.size = [10, 10];        % pix: width, height
   % dot pattern
img.dots.ulc = [0, 0];          % pix: col, row
img.dots.size = [10, 10];       % pix: width, height
img.dots.repeat = [20, 20];     % pix: horiz, vert
img.dots.num = [51,39];         % dot: across, down
   % range of dots to include in the fit
img.dots.first = [1,1];   % dot: index of UL dot to include
img.dots.last = [51,39];  % dot: index of LR dot to include
```

Referring to FIG. 2, tiled display tests pattern images are captured as indicated in a block 201. Exemplary steps for collecting image data of the tiled display tests pattern images are illustrated and described with respect to FIG. 7. Test pattern images are stored for use in later processing steps as indicated in a block 202.

Next a tile array placement and layout determination is performed using the stored test pattern image data and the image pattern description, as indicated in a block 204. An exemplary first ensemble included in the stored test pattern image data advantageously is used for the tile array placement and layout determination as illustrated and described with respect to FIG. 5. Exemplary steps of the tile array placement and layout determination procedure are illustrated and described with respect to FIG. 8.

Figure 5:
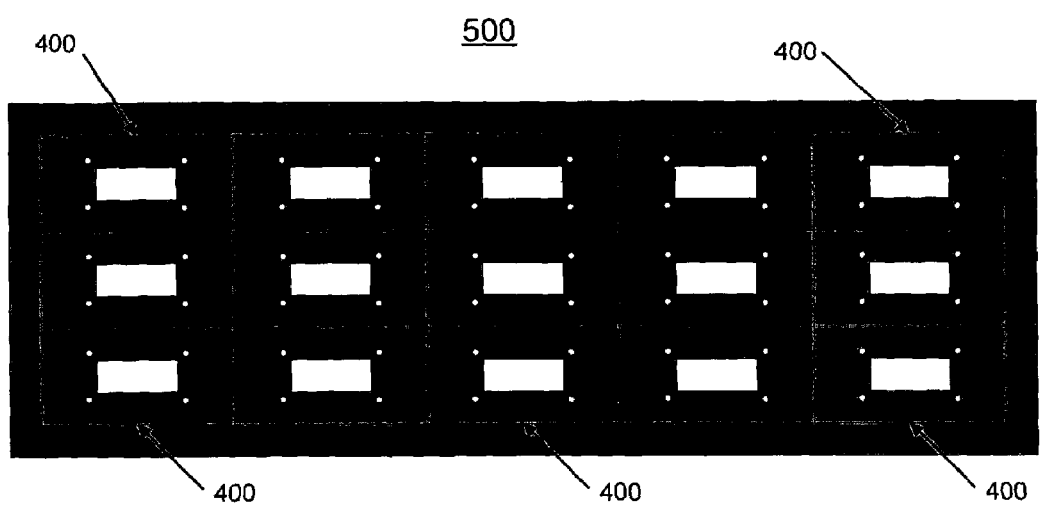
FIG. 5 is a diagram illustrating an exemplary first ensemble test pattern image used in the methods for aligning multi-projector display systems in accordance with the preferred embodiment.
Figure 6A:
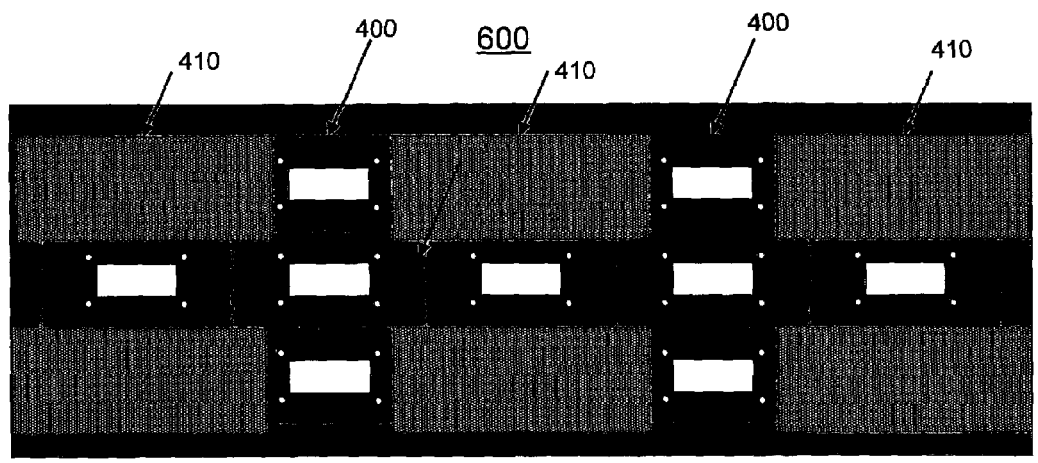
FIGS. 6A, 6B, 6C, and 6D are diagrams illustrating exemplary ensembles including both first and second test pattern images of FIGS. 3 and 4 used in the methods for aligning multi-projector display systems in accordance with the preferred embodiment.
Figure 6B:
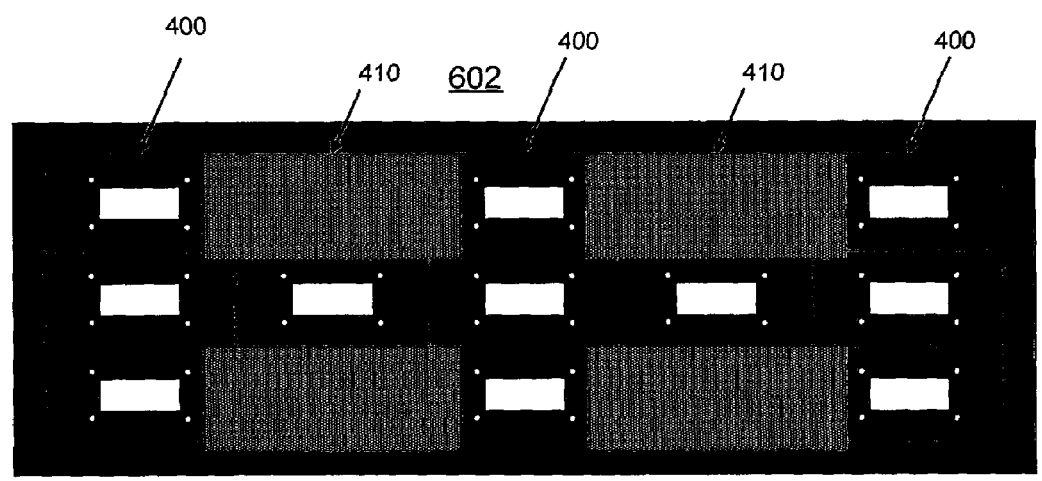
Figure 6C:
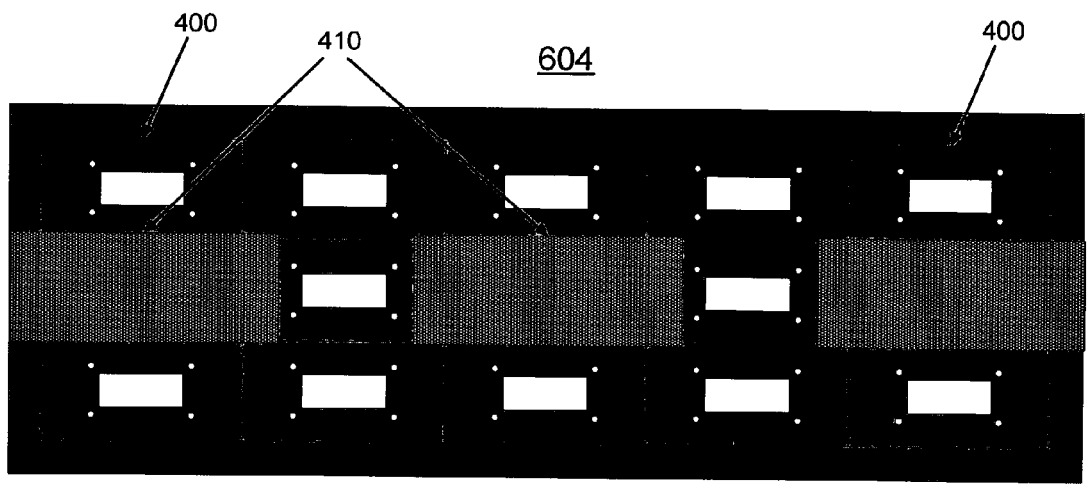
Figure 6D:
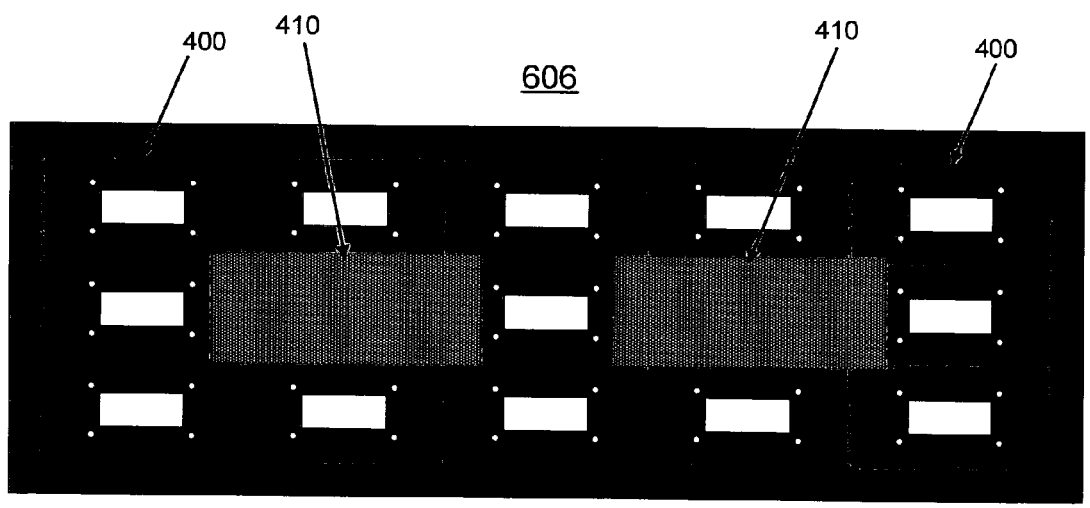

In FIG. 2, next a tile registration measurement is performed using the stored test pattern image data and the image pattern description as indicated in a block 206. The tile registration measurement uses a tile layout test pattern, for example, as shown in FIG. 5. Exemplary steps of tile registration measurement are illustrated and described with respect to FIG. 9. A dot grid estimate is stored as indicated in a block 207.

A jitter and drift measurement routine is performed using the stored test pattern image data as indicated in a block 208. The jitter and drift measurement uses ensembles including both first and second test pattern images, for example, as illustrated and described with respect to FIGS. 6A, 6B, 6C, and 6D. Exemplary steps of jitter and drift measurement procedure are illustrated and described with respect to FIG. 10.

Next a dot grid measurement procedure is performed using the stored test pattern image data, the image pattern description and the stored dot grid estimate as indicated in a block 210 and resulting measured dot grid positions are stored as indicated in a block 212. Exemplary steps of the dot grid measurement procedure are illustrated and described with respect to FIG. 11.

A tile-to-camera map is calculated using the stored test pattern image data and the measured dot grid positions as indicated in a block 214. Exemplary steps of the tile-to-camera map calculation procedure are illustrated and described with respect to FIG. 12. The calculated tile-to-camera map is stored as indicated in a block 216. Two-dimensional coordinate systems are used for each individual projected sub-image or projector image tile. A pixel addressing scheme of the frame buffer is used as a coordinate system for this image tile, for example, taking on values in the range (0 . . . 1023, 0 . . . 767) for pixels that can be illuminated. The digital camera used to make measurements introduces an intermediate coordinate system including the pixel coordinates of the detector in the camera 108.

A camera-to-mural map is calculated using the stored test pattern image data and the measured dot grid positions as indicated in a block 218. Exemplary steps of the camera-to-mural map calculation procedure are illustrated and described with respect to FIG. 13. The calculated camera-to-mural map is stored as indicated in a block 220. A global coordinate system for the mural or the entire tiled display is used to label physical points on the entire flat display surface. From the standpoint the tiled display, the stored camera-to-mural map uses a virtual frame buffer with virtual pixel coordinates in the form of row and column values, analogous to the frame buffer coordinates of the individual image tiles. The stored camera-to-mural map is a detailed and accurate mapping of pixels coordinates for each projector 102 in the array to a unified coordinate system for the entire mural.

A control and correction data generation routine is performed using the stored tile-to-camera map and the camera-to-mural map as indicated in a block 222. Exemplary steps of the control and correction data generation are illustrated and described with respect to FIG. 14.

Figure 3:
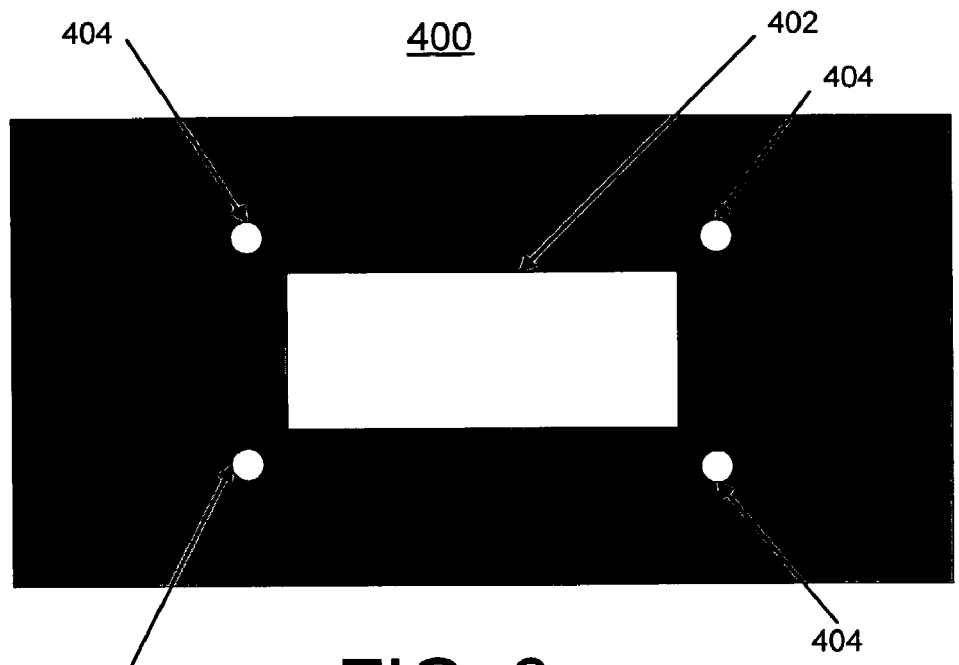
FIGS. 3 and 4 are diagrams illustrating exemplary first and second test pattern images used in the methods for aligning multi-projector display systems in accordance with the preferred embodiment.
Figure 4:
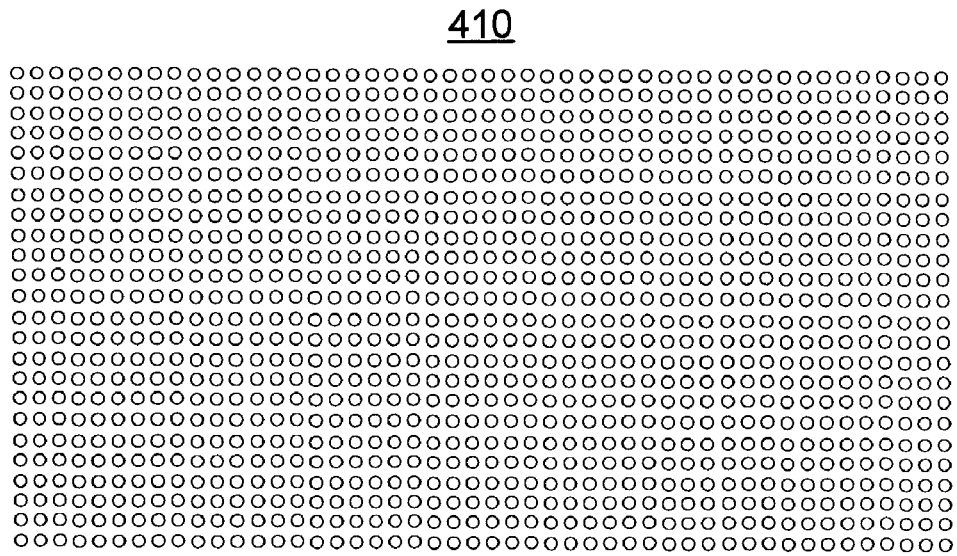

Referring to FIGS. 3 and 4, there are shown exemplary first and second test pattern images generally designated respectively by the reference characters 400, 410 for use in the methods for aligning multi-projector display system 100 in accordance with the preferred embodiment. The illustrated first test pattern image 400 is optimized for determining tile layout. The illustrated second test pattern image 410 is optimized for detailed measurement of tile geometry. A basic projected image for each projector 102 fits on a single tile in the composite display. The tile layout is the overall layout of the array of sub-images or tiles from the array of projectors 102. The illustrated first test pattern image 400 includes a central rectangular segment 402 and a plurality of registration marks 404 disposed at points relative to the corners of segment 402. The illustrated second test pattern image 410 is a dot pattern including a generally uniform array of uniformly sized dots. It should be understood that the present invention is not limited to the illustrated dot pattern 410 of features, for example, various other shapes could be used within the second test pattern image 410.

Referring now to FIG. 5, there is shown an exemplary first ensemble test pattern image generally designated by the reference character 500 in accordance with the preferred embodiment that is used in the tile array placement and layout determination at block 204 of FIG. 2. The illustrated first ensemble test pattern image 500 includes an array of 15 projectors 102, each projecting the illustrated first test pattern image 400 shown in FIG. 3.

Referring also to FIGS. 6A, 6B, 6C, and 6D, there are shown exemplary ensembles including both first and second test pattern images 400, 410 generally designated respectively by the reference characters 600, 602, 604, and 606 in accordance with the preferred embodiment. In the ensembles 600, 602, 604, and 606, each of second test pattern images 410 are separated by a respective first test pattern image 400 to accommodate tile overlap. A respective ensemble 600, 602, 604, and 606 includes the second test pattern images 410 for each projector 102 in the array.

In accordance with features of the invention, the exemplary ensembles 500, 600, 602, 604, and 606 are used in the methods of the invention to densely sample the mapping between tile coordinates (labeled by pixel coordinates in the frame buffer driving the projector) and the camera coordinates with high contrast features in this case dots within ensembles 600, 602, 604, and 606. This approach minimizes our sensitivity to photometric issues. Also there is a benefit from the good statistics of the sheer number of features measured to determine a small number of model parameters. The methods of the invention enable determining to sub-pixel accuracy the mapping of individual projector tile pixels to the unified coordinate system of the tiled array mural. The methods of the invention enable this with a camera 108 that can have far fewer pixels than the mural.

In accordance with features of the invention, the total number of images exposed is minimized. The ideal would be to capture all of the necessary measurement data in a single exposure of the entire tiled array. For unblended or minimally overlapped tiled displays (where tiles do not overlap with their neighbors, the number of exposures needed is two in the current implementation. This could be reduced to a single image, for example, requiring more a priori information passed to the program or enhanced test pattern encoding. For tiled displays with significant tile-to-tile overlap, for example, 10%, it is possible to generate excellent results with the exemplary ensembles 500, 600, 602, 604, and 606.

In accordance with features of the invention, the image analysis is direct, involving no iteration either with the measurement process or internally as a part of converging to a solution. The solution comes from a least-squares minimization of the measurements made from the input images against a simple parameterized model of the display that accounts in a general way for projector and camera alignment and optical distortion in their lenses.

One assumption made in the measurement of the tile geometry is that the array of projectors 102 has been aligned, though not necessarily perfectly. The assumption of array alignment is used to discover the general layout of the tiles in the array and again to create a mural coordinate system. In order to get the highest accuracy in our pixel mappings, the method of the invention relies on the assumption that misalignment and distortions introduce only smooth and slowly varying changes to the coordinates. This ensures that combining the measurement of many features will reduce the measurement noise effectively without forcing use of a particular parameterized model.

Figure 7:
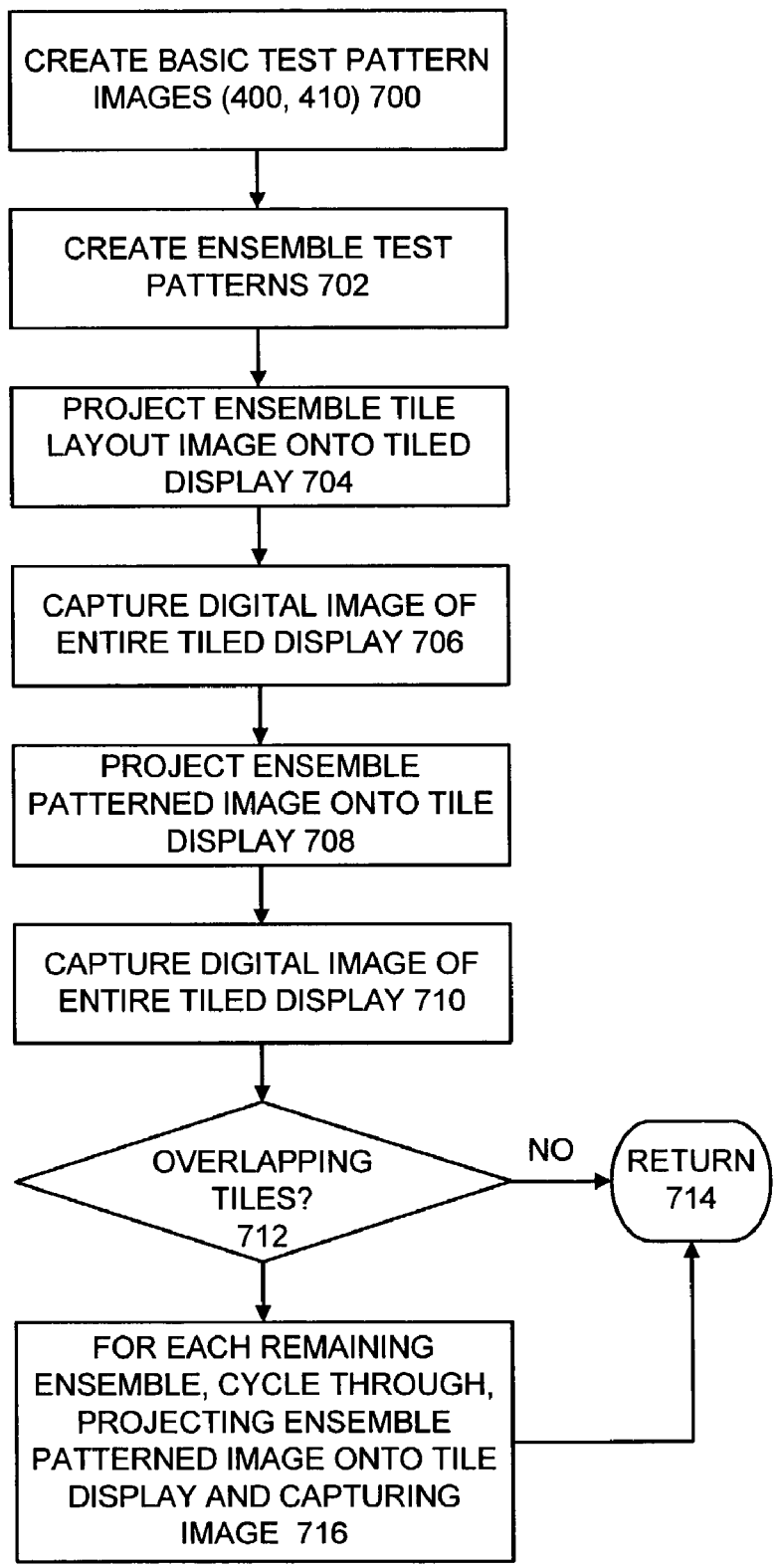
FIGS. 7, 8, 9, 10, 11, 12, 13, and 14 illustrate exemplary method steps for aligning multi-projector display systems in accordance with the preferred embodiment.

Referring to FIG. 7, exemplary steps for collecting image data of the tiled display tests pattern images are illustrated. First basic test pattern images, such as the exemplary first and second test pattern images 400, 410, are created as indicated in a block 700. Next ensemble test patterns, such as ensembles 500, 600, 602, 604, and 606 including the first and second test pattern images 400, 410, are created as indicated in a block 702. Next a first ensemble tile layout image, such as the first ensemble 500, is projected onto the tiled display as indicated in a block 704. A digital image of the entire tiled display is capture as indicated in a block 706. A next ensemble patterned image is projected onto the tiled display as indicated in a block 708. Then a digital image of the entire tiled display is capture as indicated in a block 710. It is determined whether the tiled display includes overlapping tiles as indicated in a decision block 712. When overlapping tiles are not used, then only the captured images at blocks 706 and 710 are needed and the sequential steps return as indicated in a block 714. Otherwise, when overlapping tiles are used, then for each remaining ensemble, the ensemble is projected onto the tiled display and the image captured as indicated in a block 716. With overlapping tiles, in total five ensembles, such as ensembles 500, 600, 602, 604, and 606 are projected onto the tiled display and the images captured. Then the sequential steps return at block 714.

Figure 8:
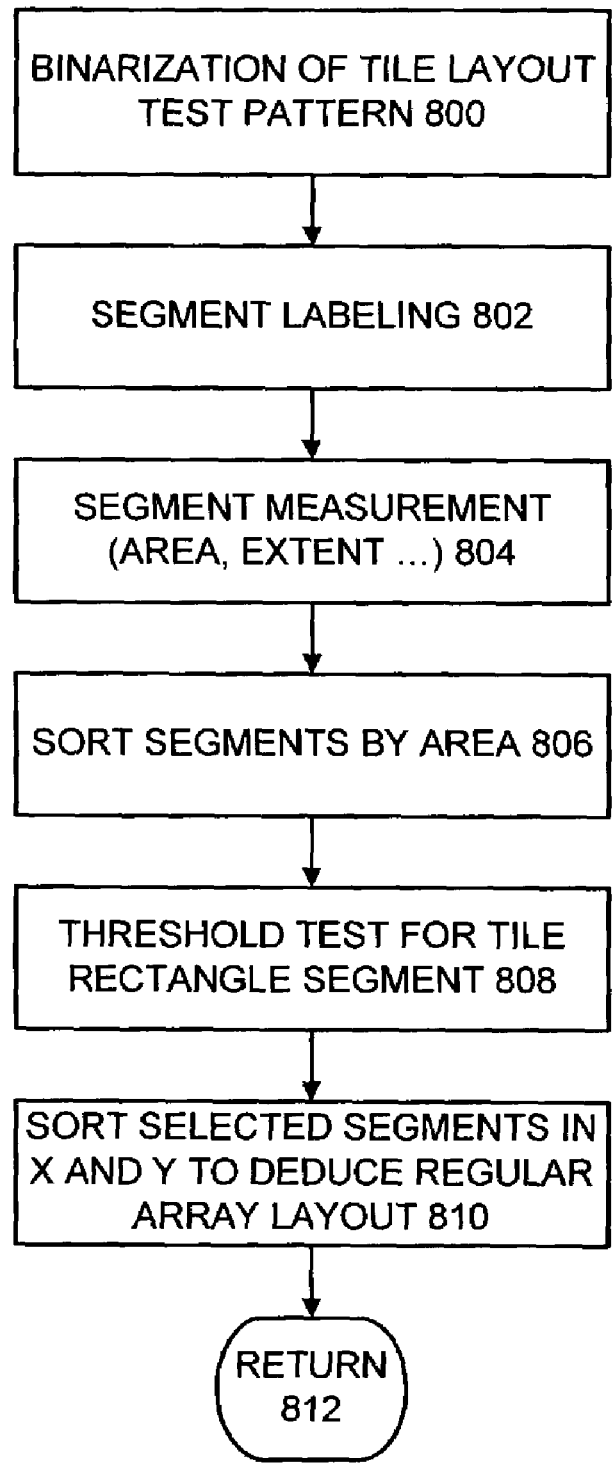

Referring now to FIG. 8, there are shown exemplary steps of the tile array placement and layout determination procedure of block 204 in FIG. 2 to determine the overall layout of the tiled array: total number of tiles, number of rows and columns in the array, and rough position of each tile in the camera coordinate system. A single image provides tile discovery, corner registration, and drift/jitter reference for correction in subsequent images referring to FIGS. 3 and 5. The large monolithic rectangular region 402 at the center of each projected area is bright enough to qualify as bigger and brighter than anything else in the image, thereby simplifying the tile discovery process immensely.

First a binarization of the tile layout test pattern 500 is performed as indicated in a block 800. The image 500 is thresholded at block 800 and then segment labeling is performed to separate the thresholded image into disjoint objects as indicated in a block 802. Segment measurement, such as by area, extent, or the like is performed as indicated in a block 804. The segments are sorted by area as indicated in a block 806. These tile segments 402 rise to the top of a list of objects sorted from largest (by pixel area) to smallest at block 806. After legitimate tiles in this list, come objects that are discarded by a simple threshold based on size. A threshold test for the tile rectangle segment 402 is performed as indicated in a block 808. Then selected segments by x and y coordinates are sorted to deduce the regular array layout as indicated in a block 810. Then the sequential operations return.

This method for tile array placement and layout determination is reasonably tolerant of oblique camera poses, which introduce size skew where objects further away will appear smaller and therefore sort to a lower position in the object list. It is fairly easy to extract total tile count with no a priori knowledge of the tiled array configuration. With little more effort, these tile objects are sorted by x and y coordinates at block 810 to deduce the number of rows and columns. This is most easily achieved by assuming that the array is regular and that the camera 108 is aligned with rows and columns along vertical and horizontal pixel coordinates. The brightness of both images in FIGS. 3 and 4 are arranged to be approximately the same to coerce the auto-gain on some cameras into the same range for all exposed images using any combination of these tile images across the array, for example, as shown in FIGS. 5, 6A, 6B, 6C, and 6D.

Figure 9:
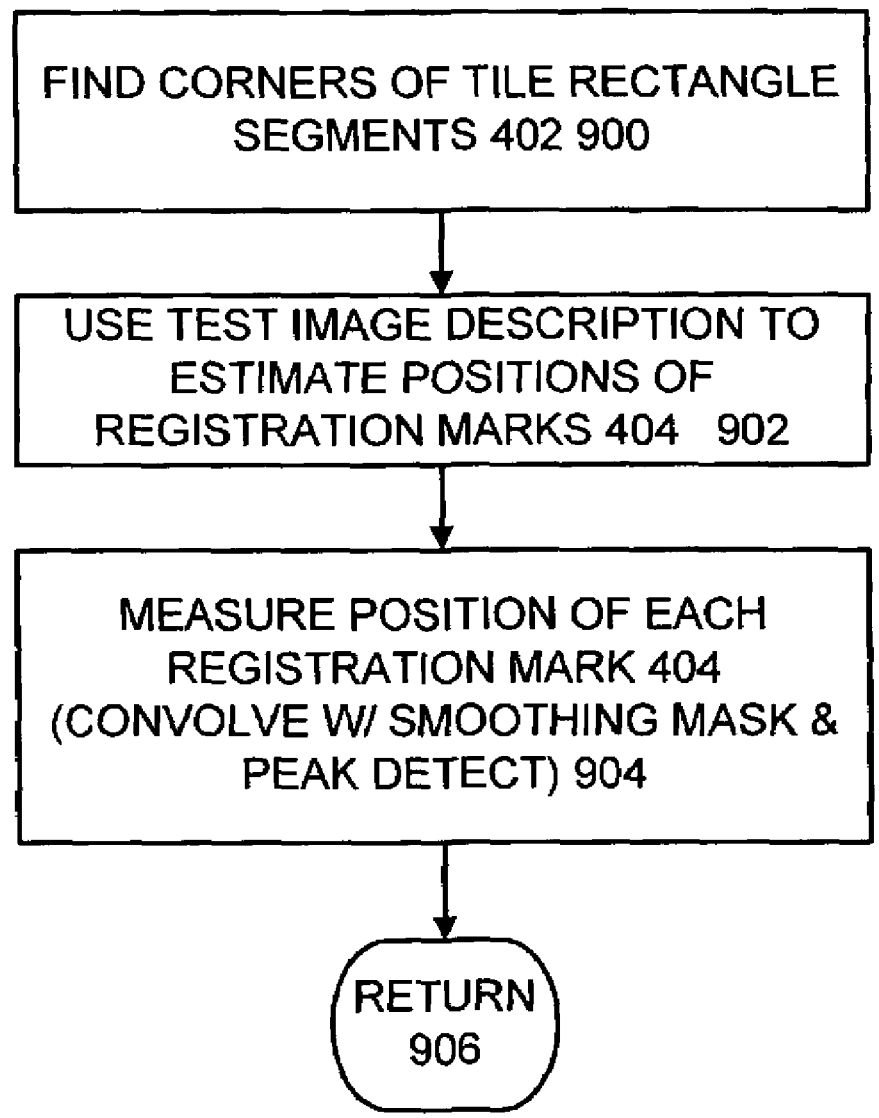

Referring now to FIG. 9, there are shown exemplary steps of the tile registration measurement procedure of block 206 in FIG. 2. Tile registration measurement is accomplished by bootstrapping from the general layout measurements, registration points are measured in each tile that will be used later to seed the detailed measurement process, such as the dot grid measurement at block 210 in FIG. 2.

Using the discovered tiles, identified by the large central tile rectangle segment 402, the coordinates of the corners of the rectangular segments are identified as indicated in a block 900. These corners are used to estimate the position of the four individual dots 404, which serve as registration for later steps in the process. The test image description is used to estimate the positions of the registration marks 404 as indicated in a block 902. A measured position for each of the four corner registration dots 404 is recorded for each of the N tiles as indicated in a block 904. The measurement is made by first constructing a template with known shape parameterized by scale factors determined from the estimated corner feature positions. At block 904, the template, for example, is used locally convolved with the image to find the peak measured to an accuracy of a fraction of a camera pixel.

Figure 10:
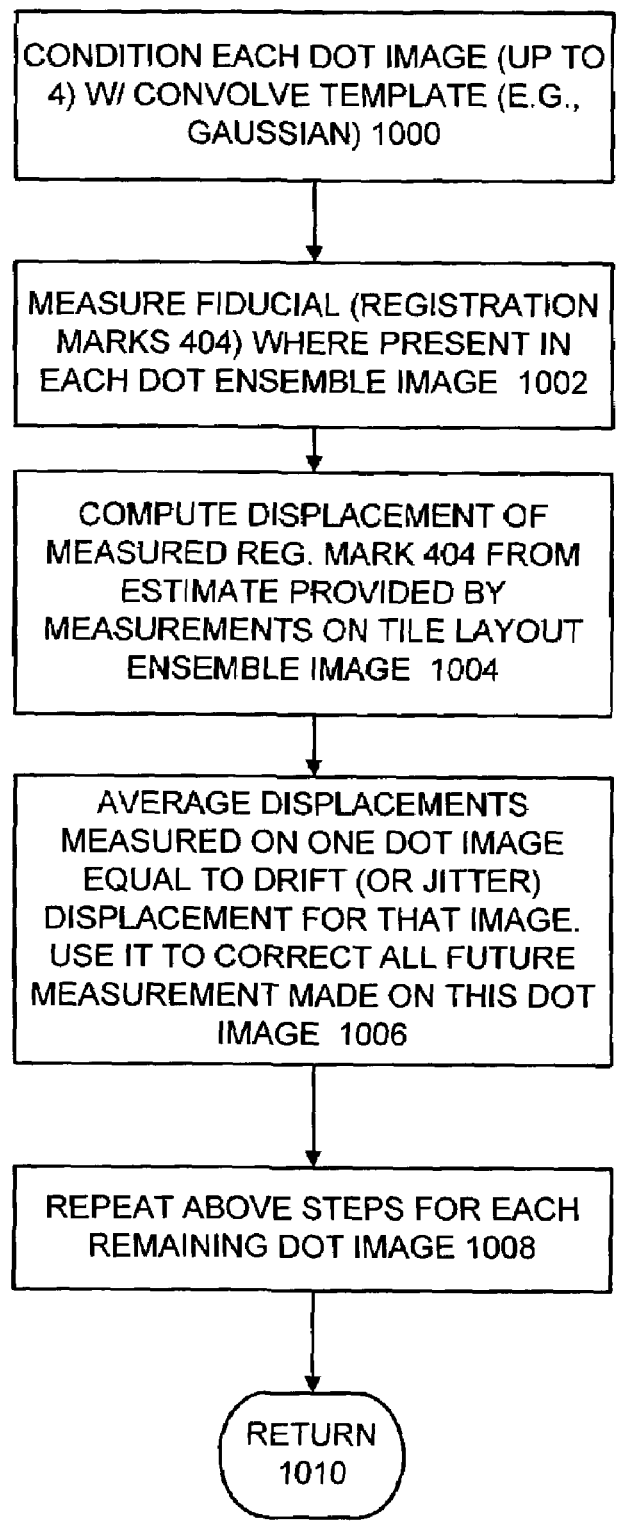

Referring to FIG. 10, exemplary steps of the jitter and drift measurement procedure of the invention are shown. Jitter and drift measurement uses ensembles including both first and second test pattern images, for example, as ensembles 600, 602, 604, and 606 of FIGS. 6A, 6B, 6C, and 6D. For applications requiring a series of images, it is important to account for possible small image-to-image movements of the camera. To accomplish this, an average of the registration feature measurements are used, available in each image, as an indicator of overall image offset with respect to the first image. First each dot image is conditioned with a convolve template, for example, a Gaussian template can be used. Fiducial, such as registration marks 404 is measured where present in each dot ensemble image as indicated in a block 1002. Displacement of the position of the measured registration marks from the estimated provided by measurement on the tile layout ensemble image is computed as indicated in a block 1004. An average of the displacements measured on one dot image is equal to the drift or jitter displacement for that image and is used to correct all future measurements made on this dot image as indicated in a block 1006. Then the above steps are repeated for each remaining dot image, when required with overlapping images, as indicated in a block 1008. Then the sequential operations return as indicated in a block 1010.

Figure 11:
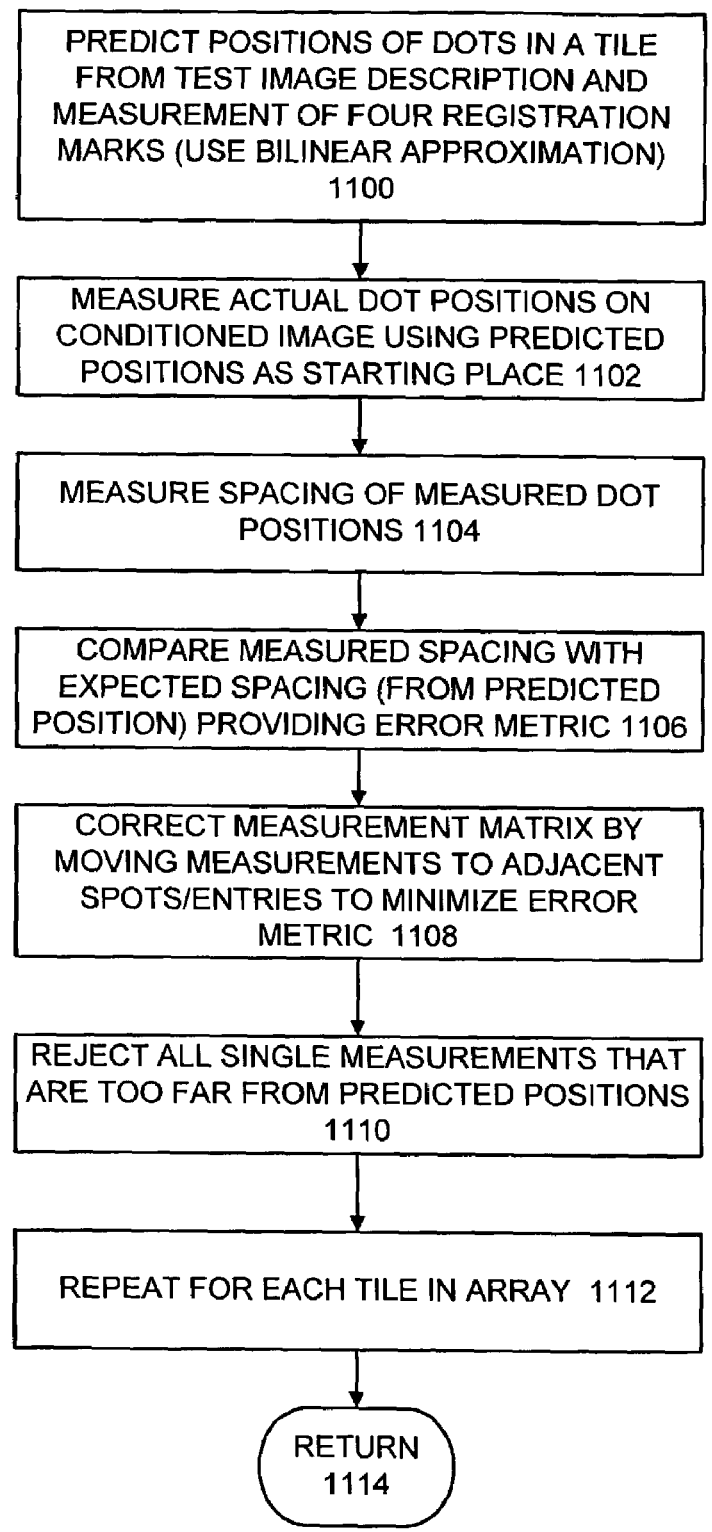

Referring to FIG. 11, exemplary steps of the dot grid measurement procedure of block 210 of FIG. 2 are shown. The detailed mapping from tile frame buffer coordinates to camera pixel coordinates is accomplished by measuring a large number of features with known tile coordinates. The image used includes fiducial pixels marked distinctively, which are far enough from the edge of the tile to avoid blending regions. Corner registration marks from the tile discovery phase correspond to these special fiducial pixels in the dot grid 410. Bilinear interpolation and extrapolation provide estimates of the coordinates of all the dot features in the image. Armed with these estimates the individual dot positions are measured in the same way that the corner registration feature were measured, by autocorrelation with a constructed mask.

The dot measurements are fit to a model. In doing so, signal to noise gain is achieved by smoothing over individual dot measurements, and the ability to extrapolate coordinates beyond the available domain of measurable dots is enabled. This latter feature is useful when measuring blended overlapping tiles.

As indicated in a block 1100, positions of dots in a tile are predicted from the test image description and measurement of the four registration marks, for example using bilinear approximation. Actual dot positions on the conditioned image are measured using the predicted positions as a starting place as indicated in a block 1102. Spacing of the measured dot positions is measured as indicated in a block 1104. The measured spacing is compared with the expected spacing, such as from the predicted position, providing an error metric as indicated in a block 1106. Next a measurement matrix is corrected by moving measurement to adjacent spots/entries to minimize error metric as indicated in a block 1108. All single measurement that are too far from the predicted positions are rejected as indicated in a block 1110. The sequential steps are repeated for each tile in the array as indicated in a block 1112. Then the sequential operations return as indicated in a block 1114.

Figure 12:
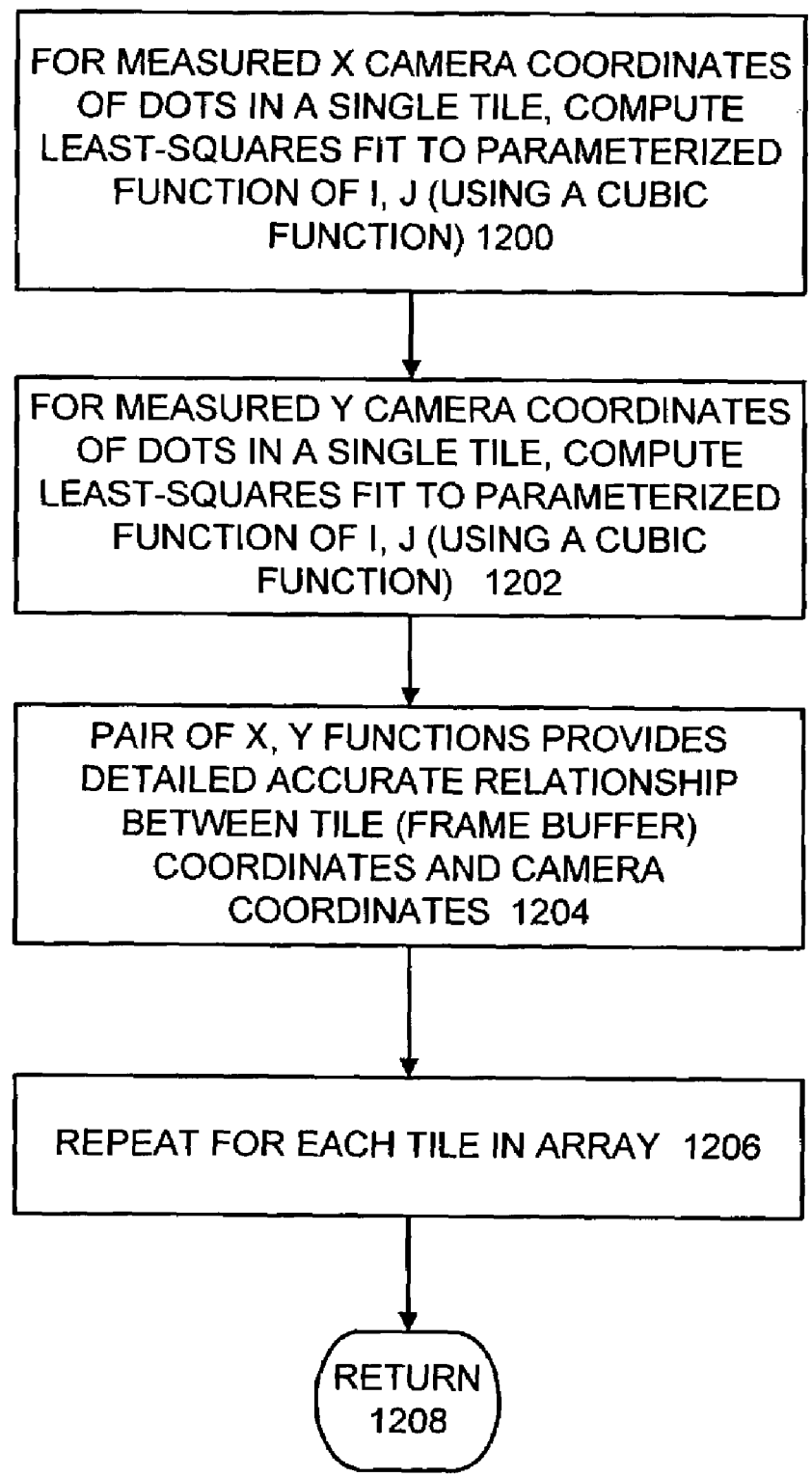

Referring to FIG. 12, there are shown exemplary steps of the tile-to-camera map calculation procedure of block 214 of FIG. 2. All measurable dot features are included in least squares fit, for example, to a 10 parameter bi-cubic model (for each of X and Y as in Equation 1, below) of the mapping. Any other suitable model is acceptable so long as it is able to represent the distortion from both the projector and camera optics. The chosen model is simple to implement, computationally efficient, and sufficiently accurate. In this step, the statistical errors in the measurement are smoothed, resulting in a significantly improved estimate of the mapping between any tile coordinate and the camera coordinate system. This is due to the very large number of features measured compared to the small number of parameters needed to model the mapping. The bi-cubic mapping from the $k^{th}$ tile coordinates to camera coordinates, in each of X and Y, is represented by the following equation, where index pair ij takes on 10 values. For each tile k the 10 coefficients for the X mapping are given by $A_k^{ij}$ and the 10 coefficients for the Y mapping are given by $B_k^{ij}$ $$(X, Y)_{camera} = \sum_{i=0}^{3} \sum_{j=0}^{i} \left(A_k^{ij}, B_k^{ij}\right) \cdot X_k^{i-j} \cdot Y_k^{j} \tag{1}$$

As indicated in a block 1200, for the measured X camera coordinates of all dots in a single tile, a least-squares fit to a parameterized function of I, J is computed, for example, using a cubic function. Note that there are, for example, many hundreds to thousands of dots in a basic single tile test image. An example cubic function used, where $I \equiv X_T$ and $J \equiv Y_T$, is represented by:

$$X = A + \\ B*I + C*J + \\ D*I^2 + E*I*J + F*J^2 + \\ G*I^3 + H*I^2J + K*I*J^2 + L*I^3$$

Next as indicated in a block 1202, for the measured Y camera coordinates of all dots in a single tile, a least-squares fit to a parameterized function of I, J similarly is computed, for example, using a cubic function. This pair of X, Y functions provides detailed accurate relationship between tile (frame buffer) coordinates and camera coordinates as indicated in a block 1204. The steps are repeated for each tile in the array as indicated in a block 1206. Then the sequential operations return as indicated in a block 1208.

Figure 13:
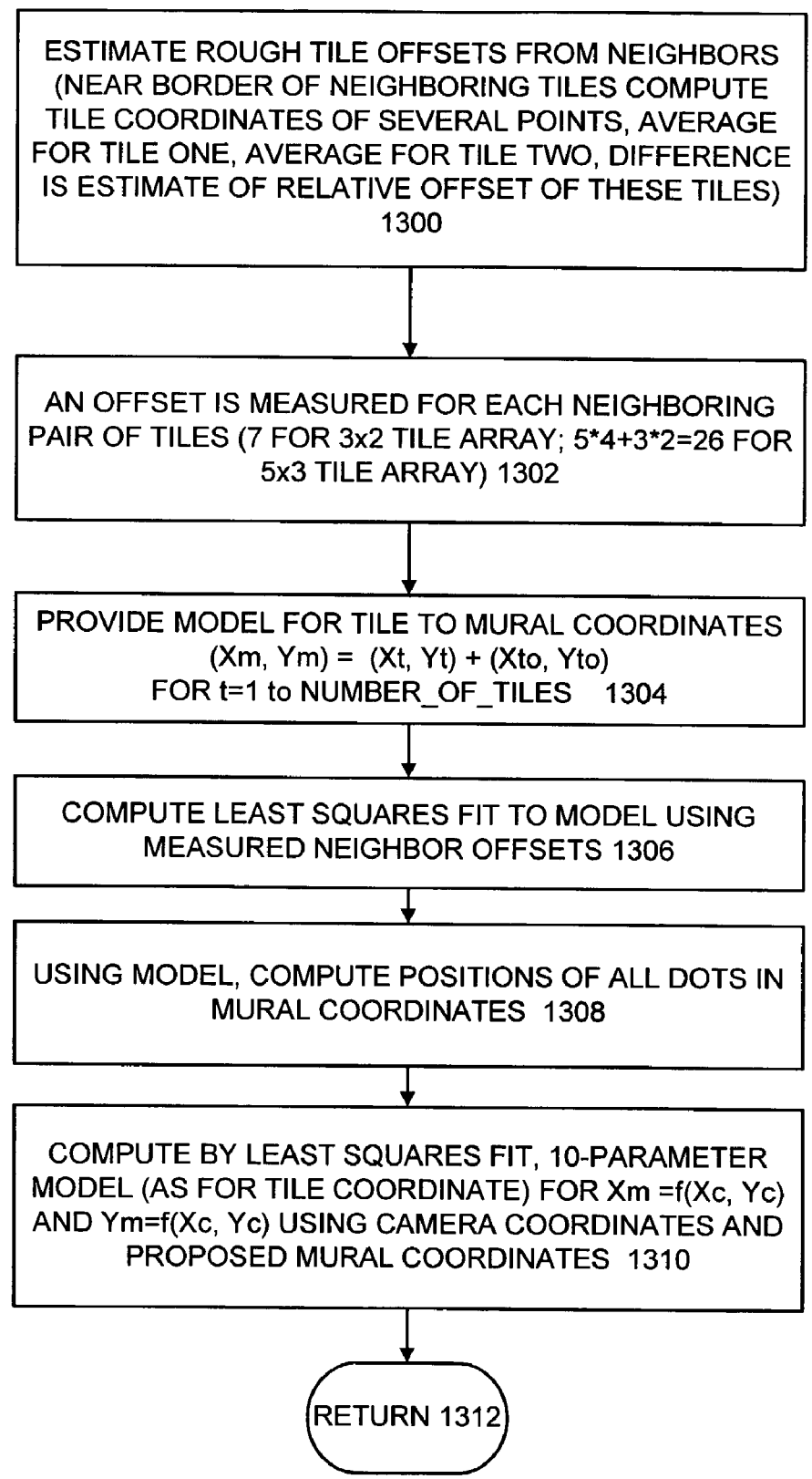

Referring to FIG. 13, there are shown exemplary steps of the camera-to-mural map calculation procedure of block 218 of FIG. 2. A mural coordinate system from the measured dots is derived as follows. First the relative offsets are estimated between neighboring pairs of projectors by comparing coordinates along their shared borders. From this simplified model of tile-to-tile coordinate transformation an approximate camera-to-mural mapping is created. This method assumes that the tiles are essentially undistorted, have been aligned, and have similar zoom, deviations from these assumptions are smoothed out in the next steps. The approximate mapping is used to project measured tile dot positions through camera coordinates to this estimated mural coordinate system. Then the resulting multitude of dots is used to find a best fit in the least-squares sense of the measured dots in camera coordinates to their estimated mural coordinates. The fit produces, for example, a pair of 10 parameter bi-cubic equations relating camera pixel coordinates to our derived mural coordinate system. The form is identical to the tile-to-camera mappings and is shown in equation 2.

$$(X, Y)_{mural} = \sum_{i=0}^{3} \sum_{j=0}^{i} \left(A_{camera}^{ij}, B_{camera}^{ij}\right) \cdot X_{camera}^{i-j} \cdot Y_{camera}^{j} \tag{2}$$

For improved immunity to numerical precision errors, the A and B parameters in both equations (1) and (2) can be referred to centered and normalized coordinates. That is, $X_{camera}$ can be replaced by $(X_{camera} - X_o)/X_{norm}$, to range between 0 and 1, and similarly for $Y_{camera}$. The $A_{camera}$ and $B_{camera}$ coefficients will be generally better behaved.

In FIG. 13, as indicated in a block 1300 first rough tile offsets are estimated from neighbors, for example, near the border of neighboring tiles tile coordinates are computed for several points; then averaged for tile one and averaged for tile two and a difference is the estimate of relative offset of these tiles from one another. As indicated in a block 13092, an offset is measured for each neighboring pair of tiles, for example, 7 offsets for a 3×2 tile array or 26 offsets for a 5×3 tile array. A model is provided for the tile to mural coordinates, for example, represented by:

(Xm, Ym)=(Xt, Yt)+(Xto, Yto), for t=1 to a Number_of_Tiles, where Xto, Yto represents offset. A least-squares fit to the model is computed using the measured neighbor offsets as indicated in a block 1306. Using the model, positions of all dots in mural coordinates are computed as indicated in a block 1308. Next by least-squares fit, the 10-parameter model as for tile coordinate for Xm=(Xc, Yc) and Ym=(Xc, Yc) is computed using camera coordinates and proposed mural coordinates as indicated in a block 1310. Then the sequential operations return as indicated in a block 1312.

Figure 14:
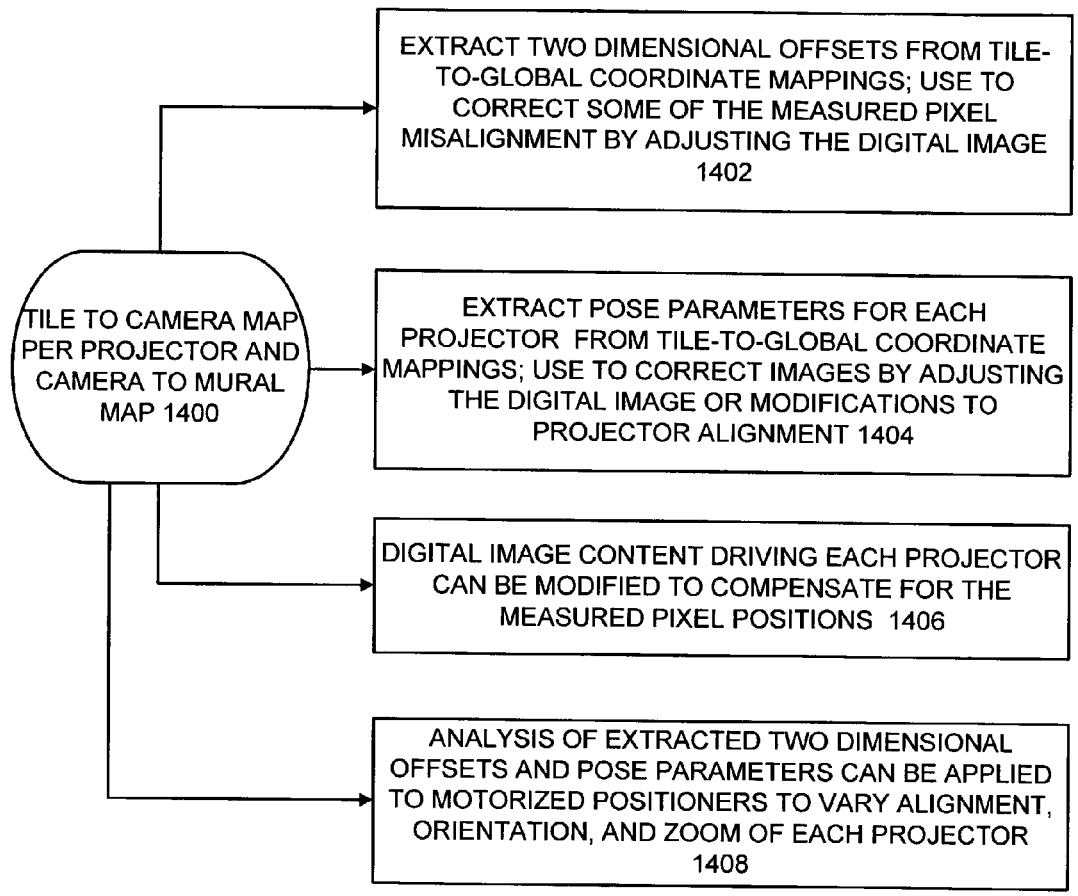

Referring to FIG. 14, there are shown exemplary steps of the control and correction data generation of block 222 of FIG. 2 using the final results from the analysis, the stored tile-to-camera map and the camera-to-mural map as indicated in a block 1400. As indicated in a block 1402, two-dimensional offsets are extracted from the tile-to-global coordinate mappings, and used to correct some of the measured pixel misalignment by adjusting the digital image for display. Pose parameters for each projector are extracted from the tile-to-global coordinate mappings can in turn be used to correct image rendering by adjusting the digital image applied to each projector 102 or modification to the projector alignment by control of respective positioner 104 as indicated in a block 1404. This application can be implemented efficiently with the addition of a simple matrix operation in the graphics pipeline. The digital image content driving each projector can be modified to compensate for the measured pixel positions as indicated in a block 1406. Also analysis of extracted two-dimensional offsets and pose parameters can be applied to motorized positioners 104 to vary alignment, orientation, and zoom of each projector 102 as indicated in a block 1408.

In summary, methods of the invention enable successfully measuring the coordinate mapping between projector frame buffer and mural coordinate system. Assuming random errors are responsible for the uncertainty in measurements of the position of a single dot, then many dots can be measured to reduce the error down to a fraction of a projector pixel. For example, the Nikon CoolPix 950 with 1600×1200 pixels can image the entire display with a scale of roughly 3 projector pixels to 1 camera pixel. If the position of a dot is measured to better than 1 camera pixel, then by measuring the positions of 10 dots the estimate is improved by the square root of 10, or to better than ⅓ camera pixel that corresponds to better than a mural pixel. With many hundreds of dots per tile, it is possible to accurately determine many more of the projector-to-camera coordinate mapping parameters than just the relative position. Sampling the mapping densely with fine grain test pattern features improves measurement accuracy in many ways by reducing a number of potential sources of error. Among the advantages provided are: high-contrast feature easy to measure, statistical leverage on low-order mapping, low camera resolution compared with the display being measured, camera pixel errors, pixel saturation and bleeding, camera lens distortion details, and electrical noise. Limiting the number of measurement images reduces susceptibility to errors induced by frame-to-frame changes in camera position, camera zoom setting, and ambient lighting. Brightness balanced test patterns with registration features of test patterns 400, 410 on all tiles for all images reduce frame-to-frame changes in exposure and enable accurate jitter and drift corrections.

While the present invention has been described with reference to the details of the embodiments of the invention shown in the drawing, these details are not intended to limit the scope of the invention as claimed in the appended claims.

What is claimed is:

1. A method for aligning multi-projector display systems comprising the steps of:
    storing an image pattern description;
    capturing tiled display test pattern images;
    using said stored image pattern description and at least one of said captured tiled display test pattern images, identifying a tile array placement and layout;
    using said stored image pattern description and at least one said captured tiled display test pattern image, performing a tile registration measurement;
    using said stored image pattern description, and at least one of said captured tiled display test pattern images, performing a dot grid measurement to provide measured dot grid positions;
    using at least one said captured tiled display test pattern images and said measured dot grid positions, calculating a tile-to-camera map;
    using at least one of said captured tiled display test pattern images and said measured dot grid positions, calculating a camera-to-mural map; and
    using said tile-to-camera map and said camera-to-mural map to generate control and correction data; said control and correction data being applied to selectively vary alignment of a plurality of projectors by control of respective associated positioners with the plurality of projectors.

2. A method for aligning multi-projector display systems as recited in claim 1 wherein said stored image pattern description image describes first and second test pattern images; said first test pattern image adapted for determining tile layout and said second test pattern image adapted for determining tile geometry.

3. A method for aligning multi-projector display systems as recited in claim 2 wherein said first test pattern image includes a generally centrally position large segment and a plurality of separate spaced apart registration marks.

4. A method for aligning multi-projector display systems as recited in claim 2 wherein said second test pattern image includes a generally uniform array of a plurality of dots.

5. A method for aligning multi-projector display systems as recited in claim 1 wherein the step of capturing tiled display test pattern images includes creating first and second test pattern images; said first test pattern image adapted for determining tile layout and said second test pattern image adapted for determining tile geometry.

6. A method for aligning multi-projector display systems as recited in claim 5 includes creating ensemble test patterns using said first and second test pattern images.

7. A method for aligning multi-projector display systems as recited in claim 6 includes creating a first ensemble test pattern for displaying said first test pattern image onto each projector tile of a multi-projector display.

8. A method for aligning multi-projector display systems as recited in claim 7 includes creating at least one second ensemble test pattern for displaying said second test pattern image onto each projector tile of the multi-projector display.

9. A method for aligning multi-projector display systems as recited in claim 8 includes the step of using a digital camera and capturing a digital image of said displayed first ensemble test pattern and said displayed at least one second ensemble test pattern.

10. A method for aligning multi-projector display systems as recited in claim 1 wherein the step of identifying said tile array placement and layout includes binarizing one said captured tiled display test pattern image, identifying and measuring a plurality of segments of said binarized image, and sorting said plurality of segments to identify said tile array placement and layout.

11. A method for aligning multi-projector display systems as recited in claim 10 includes the step of identifying a predefined registration segment.

12. A method for aligning multi-projector display systems as recited in claim 11 wherein the step of performing said tile registration measurement includes the steps of identifying corners of said predefined registration segment; estimating and measuring positions of a plurality of registration marks relative to said identified corners of said predefined registration segment.

13. A method for aligning multi-projector display systems as recited in claim 1 further includes the steps of measuring camera jitter and drift; and applying correction based upon said measured camera jitter and drift to said dot grid measurement.

14. A method for aligning multi-projector display systems as recited in claim 1 wherein the step of performing said dot grid measurement to provide measured dot grid positions includes the steps of predicting positions of a plurality of dots in a displayed tile for each projector from said test image description; measuring actual dot positions within said displayed tile for each projector; measuring a spacing of said measured actual dot positions and comparing said measured spacing with an expected spacing from said predicted positions to provide an error metric.

15. A method for aligning multi-projector display systems as recited in claim 14 further includes minimizing an error metric by moving measurement to adjacent positions; and rejecting all single measurements identified above a set spacing from predicted positions.

16. A method for aligning multi-projector display systems as recited in claim 1 wherein the step of calculating said tile-to-camera map includes computing a least-squares fit of both measured X and Y camera coordinates to a parameterized function.

17. A method for aligning multi-projector display systems as recited in claim 16 wherein the step of calculating said camera-to-mural map includes computing a least-squares fit of both measured X and Y camera coordinates to a parameterized function.

18. A method for aligning multi-projector display systems as recited in claim 17 wherein said parameterized function including a cubic function.

19. A method for aligning multi-projector display systems as recited in claim 1 wherein the step of using said tile-to-camera map and said camera-to-mural map to generate said control and correction data includes at least one of: extracting two dimensional offsets from said tile-to-camera map and using said extracted two dimensional offsets to correct at least a portion of a measured misalignment; extracting pose parameters for each projector from said tile-to-camera map and using said extracted pose parameters to correct at least a portion of a measured misalignment.

20. A measurement engine for aligning multi-projector display systems comprising:

a plurality of projectors for projecting a digital source image onto multi-projector display to form a composite image;

a respective positioner associated with each of said plurality of projectors;

a camera for capturing tiled display test pattern images;

a computer for storing an image pattern description; said computer for performing the steps of:

using said stored image pattern description and at least one of said captured tiled display test pattern images, identifying a tile array placement and layout;

using said stored image pattern description and at least one said captured tiled display test pattern image, performing a tile registration measurement;

using said stored image pattern description, and at least one of said captured tiled display test pattern images, performing a dot grid measurement to provide measured dot grid positions;

using at least one of said captured tiled display test pattern images and said measured dot grid positions, calculating a tile-to-camera map;

using at least one of said captured tiled display test pattern images and said measured dot grid positions, calculating a camera-to-mural map; and using said tile-to-camera map and said camera-to-mural map to generate control and correction data; said control and correction data being applied to selectively vary alignment of the plurality of projectors by control of respective associated positioners.

* * * * *